G. C. THOMPSON.
SAFETY BOLT.
APPLICATION FILED DEC. 23, 1912.

1,063,083. Patented May 27, 1913.

Witnesses
Floyd R. Cornwall
C. P. Wright Jr.

Inventor
George C. Thompson,
By A. S. Pattison,
Attorney

UNITED STATES PATENT OFFICE.

GEORGE C. THOMPSON, OF EAST LIVERPOOL, OHIO.

SAFETY-BOLT.

1,063,083.  Specification of Letters Patent.  Patented May 27, 1913.

Application filed December 23, 1912. Serial No. 738,260.

*To all whom it may concern:*

Be it known that I, GEORGE C. THOMPSON, a citizen of the United States, residing at East Liverpool, in the county of Columbiana and State of Ohio, have invented certain new and useful Improvements in Safety-Bolts, of which the following is a specification, reference being had therein to the accompanying drawing.

My invention relates to improvements in safety bolts.

The object of my invention is to provide a bolt of this character in which the nut can be positively locked upon the bolt against rotation and at the same time providing means whereby the nut can be readily placed upon or removed from the bolt without injury to either the nut or the bolt.

Another object of my invention is to provide a safety bolt of this character in which the nut has a wide range of adjustment thereon and in which it is positively locked in any adjusted position and at the same time providing a simple, cheap and effective bolt in which the nut cannot be removed by the backward movement or unscrewing thereof.

Figure 1:
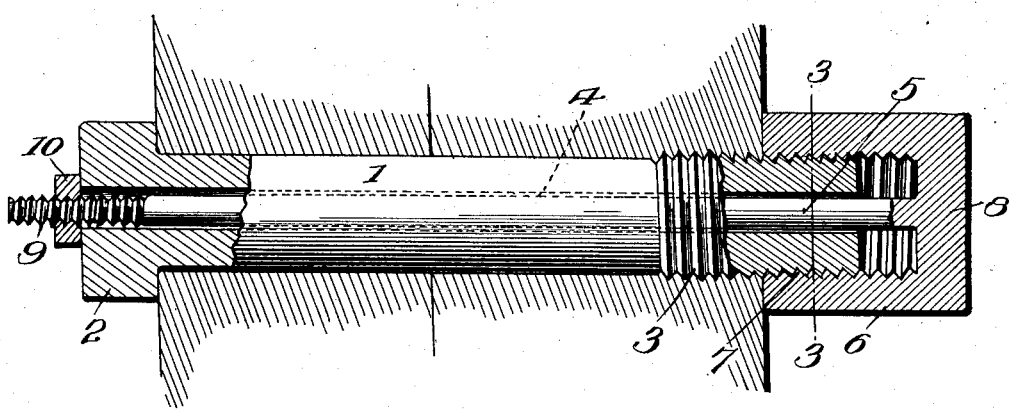
Figure 2:
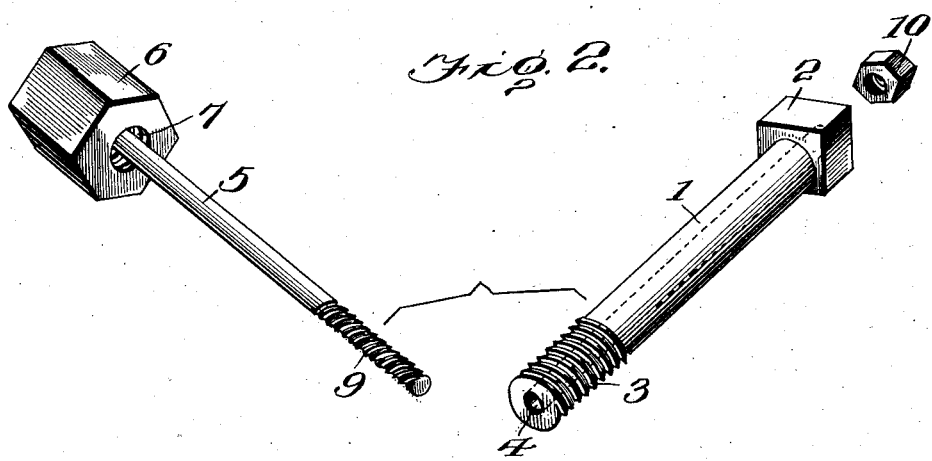
Figure 3:
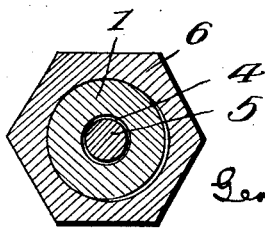

In the accompanying drawings Figure 1 is a vertical sectional view showing my bolt applied and showing the ends of the bolt in section. Fig. 2 is a detached perspective view of my improved bolt. Fig. 3 is a vertical sectional view taken on the line 3—3 of Fig. 1.

Referring now to the drawings, 1 represents my improved bolt, which is provided at one end with a head 2, which may be of a round or square form as the structure of this head forms no part of my invention. The opposite end of the bolt is externally threaded, as indicated at 3, said threads being what are known as right hand threads. The bolt is provided with a bore 4, extending throughout its entire length and through which loosely passes the locking rod 5.

Screwed upon the threads 3 on the end of the bolt opposite the head, is a nut 6, having the internally threaded portion 7 and the solid end portion 8. The end portion 8 of the nut is provided with the rod 5, heretofore described, and said rod being of a diameter slightly less than that of the bore 4 to allow the same to freely pass therethrough and also to rotate during the screwing of the nut on the bolt. The said rod is of a length to extend beyond the head 2 of the bolt and is screw threaded at 9. The threads 9 of the rod 5 are left hand threads and screwed thereon is a nut 10 which is adapted to engage the head 2 of the bolt and locks the rod 5 against rotation, and the nut 6 being carried by the rod 5, the same will be held against rotation on the bolt.

In operation the bolt is placed in the desired position and the rod 5 inserted in the bore 4 of the bolt, and the nut screwed upon the bolt until its inner face engages a part or parts to be secured together. The rod 5 extends beyond the head 2 of the bolt, as clearly shown in Fig. 1. The nut 10 is then screwed upon the threads 9 of the rod 5, and the threads 9 being left hand threads the nut is necessarily turned in an opposite direction to the nut 6. The nut 10 is firmly screwed against the outer face of the head and it will be seen that upon the backward movement of the nut 6, the rod 5 is rotated in a direction owing to the left hand threads 9 causing the nut 10 to more tightly bind against the head 2 of the bolt. This prevents the rod 5 from having any material backward movement and the nut being carried by the rod, it will be readily seen that an unscrewing of the nut is prevented.

Applicant's structure is such as will be clearly seen that the nut 6 can be at any time tightened on the bolt and it is only necessary to turn the nut 10 up against the head 2 of the bolt in order to again lock the nut 6. When it is desired to remove the nut 6 from the bolt 1, the nut 10 is unscrewed from the rod 5 and the nut 6 is then free to be unscrewed from the bolt.

Having thus described my invention, what I claim and desire to secure by Letters Patent is:

1. A safety bolt, comprising a bolt having a bore throughout its entire length, said bolt having a head at one end and externally threaded at the opposite end, a nut having a hollow internally threaded portion and a rod carried by the nut and extending loosely through the bore of the bolt, and a nut on said rod on the outside of the head for locking the rod against rotation in a backward direction.

2. A safety bolt comprising a bolt having a bore throughout its entire length, said bolt having a head at one end and externally threaded at the opposite end, a nut having a hollow internally threaded portion, a rod carried by the nut and extending loosely through the bore of the bolt and having its outer free end externally threaded in opposite direction to the thread of the bolt, and a nut screwed on the rod and engaging the head of the bolt.

3. A safety bolt, comprising a bolt having a bore throughout its entire length and externally threaded at one end, a nut screwed upon the bolt and a rod rigidly carried by the nut and extending loosely through the bore of the bolt, and a nut screwed on the outer end of the rod on the outside of the head in an opposite direction to that of the first mentioned nut.

4. A safety bolt, comprising a bolt having a bore throughout its entire length, said bolt having a head at one end and externally threaded at the opposite end, a nut having a closed outer end, and a rod carried by the said closed outer end and extending loosely through the bore of the bolt, and a nut screwed on said rod in the opposite direction to that of the first-mentioned nut and adapted to engage the head of the bolt.

5. A safety bolt, comprising a bolt having a bore throughout its entire length, said bolt having a head at one end and externally threaded at the opposite end, a nut screwed upon the bolt and having a closed outer end, said closed outer end having formed integral therewith a rod extending loosely through the bore of the bolt and beyond the head thereof, and a nut screwed upon the rod on the outside of the head of the bolt in an opposite direction to that of the nut carried by the bolt.

In testimony whereof I hereunto affix my signature in the presence of two witnesses.

GEORGE C. THOMPSON.

Witnesses:
J. D. YOAKLEY,
C. R. WRIGHT, Jr.

---

Copies of this patent may be obtained for five cents each, by addressing the "Commissioner of Patents, Washington, D. C."